(12) United States Patent
Dodgen et al.

(10) Patent No.: US 9,230,351 B2
(45) Date of Patent: Jan. 5, 2016

(54) DATA BINDING GRAPH FOR INTERACTIVE CHART

(71) Applicant: Microsoft Corporation, Redmond, WA (US)

(72) Inventors: Randy Joe Dodgen, Seattle, WA (US); Oscar P. Kozlowski, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 169 days.

(21) Appl. No.: 13/795,408

(22) Filed: Mar. 12, 2013

(65) Prior Publication Data

US 2014/0267287 A1  Sep. 18, 2014

(51) Int. Cl.
*G06T 11/20* (2006.01)
*G06F 3/048* (2013.01)

(52) U.S. Cl.
CPC .............. *G06T 11/206* (2013.01); *G06F 3/048* (2013.01)

(58) Field of Classification Search
CPC .................................................. G06T 11/206
USPC ........................................................ 345/440
See application file for complete search history.

(56) References Cited

U.S. PATENT DOCUMENTS

| | | | |
|---|---|---|---|
| 6,266,053 B1 * | 7/2001 | French et al. ................. | 715/255 |
| 7,734,607 B2 | 6/2010 | Grinstein et al. | |
| 2004/0201588 A1 | 10/2004 | Meanor et al. | |
| 2010/0156889 A1 | 6/2010 | Martinez et al. | |
| 2010/0262901 A1 * | 10/2010 | Disalvo ......................... | 715/227 |
| 2011/0249003 A1 * | 10/2011 | Mercuri ........................ | 345/440 |
| 2011/0283231 A1 | 11/2011 | Richstein et al. | |
| 2012/0011474 A1 | 1/2012 | Kashik et al. | |
| 2012/0271748 A1 | 10/2012 | DiSalvo | |
| 2012/0313949 A1 | 12/2012 | Rope et al. | |

OTHER PUBLICATIONS

Scherr, Multiple and Coordinated Views in Information Visualization, Trends in Information Visualization, Technical Report LMU-MI-2010-1, Apr. 2010, pp. 38-45.*
Wang et al., A Java 3D-Enabled Cyber Workspace, Communications of the ACM, vol. 45, No. 11, Nov. 2002, pp. 45-49.*
Scherr, Maximilian, "Multiple and Coordinated Views in Information Visualization", Retrieved on: Feb. 28, 2013, Available at: http://www.medien.ifi.lmu.de/lehre/ws0809/hs/docs/scherr.pdf.

(Continued)

*Primary Examiner* — Charles Tseng
(74) *Attorney, Agent, or Firm* — Nicholas Chen; Aaron Hoff; Micky Minhas

(57) ABSTRACT

Implementing multi-view visualizations in a computing environment. A method includes accessing a directed acyclic graph defining a data flow. The directed acyclic graph includes one or more data source nodes. The acyclic graph has a first visualization node connected to one of the data source nodes of the directed acyclic graph. The acyclic graph has a second visualization node connected to one of the data source nodes of the directed acyclic graph. The method further includes detecting user interaction with a visualization element of the first visualization node. The method further includes propagating the user interaction with the visualization element to the data source node to which the first visualization node is connected. The method further includes propagating the user interaction with the visualization element from the data source node to which the first visualization node is connected to the second visualization node.

20 Claims, 8 Drawing Sheets

(56) References Cited

OTHER PUBLICATIONS

Huang, et al., "Quantitative Visualization of ChIP-chip Data by Using Linked Views", In the IEEE International Conference on Bioinformatics and Biomedicine Workshops, Dec. 18, 2010, 6 pages.
Krasner, G., et al., "A Description of the Model-View-Controller User Interface Paradigm in the Smalltalk-80 System (1988)", Journal of Object-Oriented Programming, New York, NY, US, vol. 1, No. 3, Jan. 1998, pp. 1-34.
Anonymous, "IBM Visualization Data Explorer User's Guide Version 3 Release 1 Modification 4", May 1997, pp. 1-370. Available at <<http://www.dig.cs.gc.cuny.edu/manuals/DX/userguide.pdf>>.
International Search Report & Written Opinion for PCT Patent Application No. PCT/US2014/020807, Mailed Date: May 21, 2014, Filed Date: Mar. 5, 2014, 13 pages. (MS#338465.02).
"How NodeBox Works", Available at least as early as Nov. 2012, 9 pages. Available at <<https://www.webarchive.org/web/20121113215126/http:/nodebox.net/node/documentation/concepts/concepts.html>>.
"Exploring Nodes", Available at least as early as Nov. 2012, 9 pages. Available at <<https://web.archive.org/web/20121113210034/http:/nodebox.net/node/documentation/tutorial/exploring>>.
"Meet NodeBox 3.", Available at least as early as Nov. 2012, 3 pages. Available at <<https://web.archive.org/web/20121110234149/http:/nodebox.net/node/>>.

* cited by examiner

DATA BINDING GRAPH FOR INTERACTIVE CHART

BACKGROUND

Background and Relevant Art

Computers and computing systems have affected nearly every aspect of modern living. Computers are generally involved in work, recreation, healthcare, transportation, entertainment, household management, etc.

Many computers are intended to be used by direct user interaction with the computer. As such, computers have input hardware and software user interfaces to facilitate user interaction. For example, a modern general purpose computer may include a keyboard, mouse, touchpad, camera, etc. for allowing a user to input data into the computer. In addition, various software user interfaces and display functionalities may be available.

Some user interfaces provide various views of data. In some embodiments this may be done with multi-chart views with include rich brushing and linking of elements in the views. Brushing and linking refers to the connection of different views such that changes in one representation change the other representation(s). Well-known charting packages typically leave to the users the work of creating and maintaining the rich brushing and linking of elements in the views. The imperative plumbing required to keep multiple chart views consistent is therefore, error-prone and can be of significant complexity.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method for implementing multi-view visualizations in a computing environment. The method includes accessing a directed acyclic graph defining a data flow. The directed acyclic graph includes one or more data source nodes. The data source nodes include at least one or more data nodes and optionally one or more derived data nodes. The data nodes define data that can flow in the directed acyclic graph. Any derived data nodes define modified data according operations performed on data flowing from a previous node by operation of the directed acyclic graph. The acyclic graph has a first visualization node connected to one of the data source nodes of the directed acyclic graph. The acyclic graph has a second visualization node connected to one of the data source nodes of the directed acyclic graph. The method further includes detecting user interaction with a visualization element of the first visualization node. The method further includes propagating the user interaction with the visualization element to the data source node to which the first visualization node is connected. The method further includes propagating the user interaction with the visualization element from the data source node to which the first visualization node is connected to the second visualization node.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments described herein are directed to describing data and operations on data using a directed acyclic graph. Visualizations of data can be accomplished by coupling visualization nodes to nodes of the graph. User interaction with the visualizations is propagated back to the nodes to which the visualizations are connected. Finally, by operation of the directed acyclic graph, the user interactions are propagated downstream to other nodes where the user interactions affect visualization nodes (and hence visualizations) connected to downstream data source nodes of the directed acyclic graph.

Figure 1:
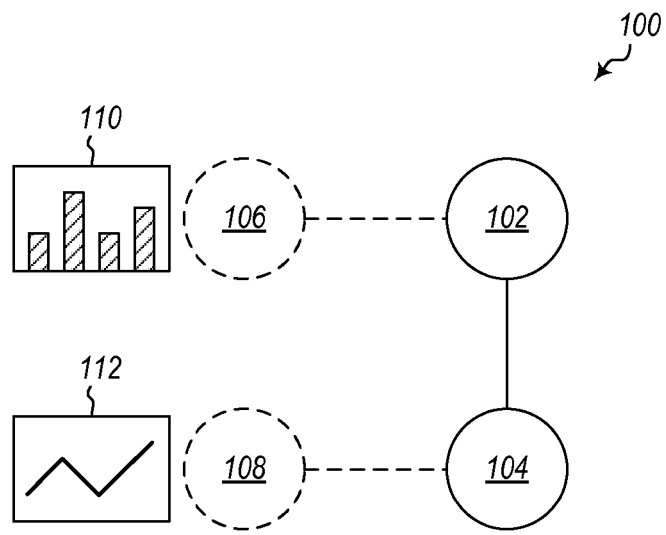
FIG. 1 illustrates a directed acyclic graph and visualization nodes.

FIG. 1 illustrates a simple example. In particular, FIG. 1 illustrates a directed acyclic graph 100 including a data source node 102 and a data source node 104. Data in the graph 100 flows from node 102 to node 104. FIG. 1 further illustrates a visualization node 106 coupled to the data source node 102. A visualization node 108 is coupled to the data source node 104. Visualization node 106 defines a way of viewing data from the data source node 102. For example, the visualization node 106 may indicate that data from the data source node 102 is illustrated using a bar chart 110. Similarly, visualization node 108 defines a way of viewing data from the data source node 104. For example, the visualization node 108 may indicate that data from the data source node 102 is illustrated using a line chart 112.

A user is able to interact with visualization elements provided by the visualization nodes. For example, a user could interact with the bar chart 110. In particular, a user may select certain data points. The user interaction with visualization elements of the visualization node 106 (e.g., the selection of data points) is propagated back to the data source node 102. By operation of the graph 100, the interaction is propagated to the data source node 104. Because the visualization node 108 is coupled to the data source node 104, the interaction with visualization elements is propagated to the visualization node 108. Thus, for example, data points in the line chart 112 that are related to the selected data points in the bar chart 110 will also be selected.

Data points may be related in a number of different ways. For example, the data points may be the same data points in the different visualizations. Alternatively data points in one visualization (such as in the line chart 112) may be points related to an expansion of data points in another visualization (such as the bar chart 110).

Figure 2:
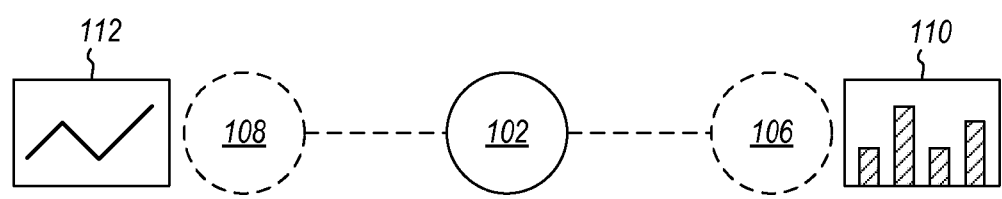
FIG. 2 illustrates another example of a directed acyclic graph and visualization nodes.

FIG. 2 illustrates an even more primitive example. In FIG. 2, both visualization nodes 106 and 108 are coupled to the data source node 102. In this example, a user can interact with visualization elements of the bar chart 110 (or the line chart 112) and the interactions will be propagated from the visualization node 106 (or 108) through the data source node 102 to the visualization node 108 (or 106) where the interactions will be represented in the line chart 112 (or the bar chart 110).

User interactions with visualization elements that may be propagated may include, for example, panning or scrolling, selection of data elements, zooming in or out on data elements, expanding data elements, applying color or highlighting to data elements, etc.

Propagating user interaction is done based on relationships of data at different data source nodes of a graph. For example, different data source nodes will typically represent related data, or different views of data, but not exactly the same data. For example, data source node 102 may represent a raw data view of some data set. The data source node 104 may be an expansion node that provides an expanded view of the data of the data source node 102. Thus, in some embodiments, if a user selects a data item in the bar chart 110 from the data set of the data source node 102, an expanded data set derived from the data item will be selected in the line chart 112. In the example illustrated in FIG. 2, the data set for both visualization nodes 106 and 108 is the same data, so selecting a data element in the line chart 112 will result in the same data element being selected in the bar chart 110.

The directed acyclic graph data source nodes represent either data nodes or derived data nodes. The data nodes represent a raw set of data. The derived data nodes represent an operational view of data flowing from a previous node. Note that the graph can be cascading such that a derived data node may represent a view of a view. An example of this is illustrated, as will be discussed in more detail below, in conjunction with the description of FIG. 3.

As noted previously, chart elements (e.g. lines and bars) are bound to data sources (i.e. by binding visualization nodes to data source nodes) and updated in response to changes to their data sources. Data sources can be linked together to represent derived data. For example, a filter data source may contain the subset of its parent source that is currently selected. As linked data sources update in response to each other, this enables rich brushing and linking among multiple charts attached to the graph from only a declarative description.

Embodiments may include a set of primitives to facilitate common relations and linkages between data and charts. The primitives may be implemented as derived data sources within a graph. An example of a derived data source is the filter source discussed above. Other examples of primitives may include color assignment, expansion of one-to-many relationships in data, filtering, grouping, reduction including many-to-one calculations, etc.

This declarative model facilitates efficient chart redraws as a result of user interaction with visualization elements and updates to data as the embodiments can track changes within the graph and recalculate and/or redraw only those elements which need to be redrawn to show the interactions and updates.

Figure 3:
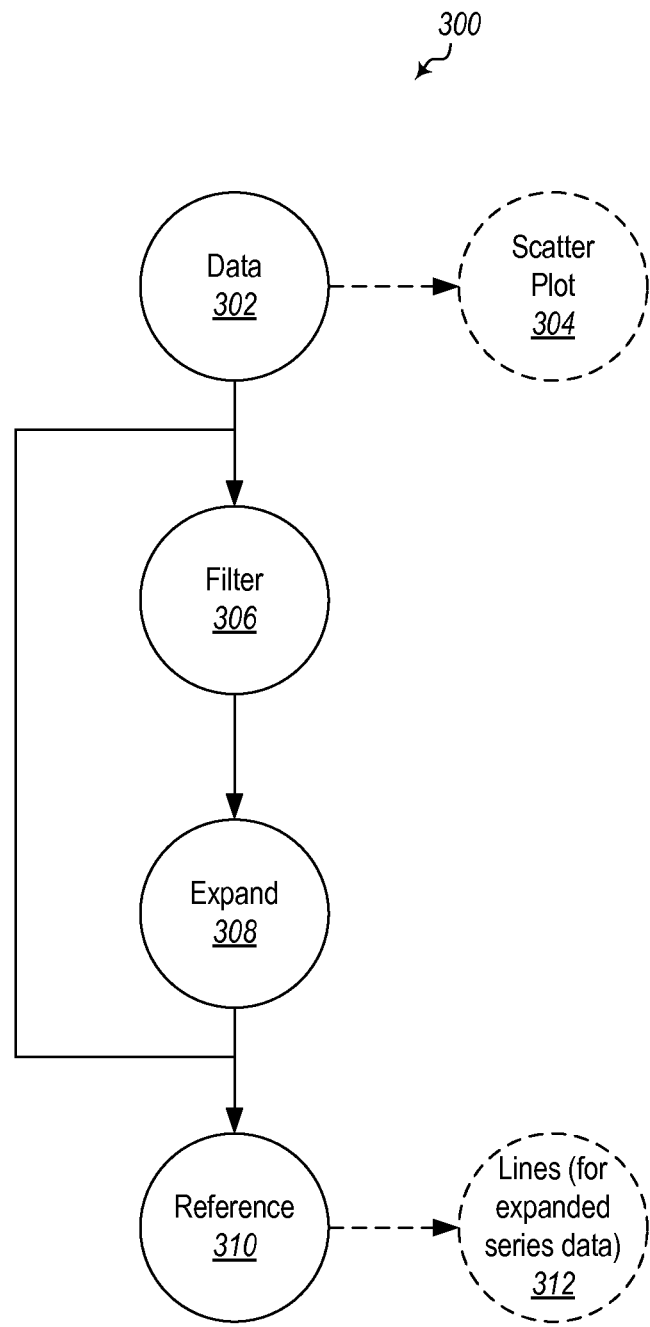
FIG. 3 illustrates yet another example of a directed acyclic graph and visualization nodes.

Referring now to FIG. 3, a more complex example of a data-binding graph 300 is illustrated. In the example illustrated in FIG. 3, the solid-lined nodes (representing data sources) are connected by directed edges, without forming cycles, as is characteristic of a directed acyclic graph.

The data source node 302 contains the original data to be charted. In this example, the data of the node 302 represents a set of companies, each having two performance metrics and a series of historical stock prices. The scatter plot visualization node 304 represents a scatter plot chart of the two metrics. The filter data source node 306 is a derived data source with one parent (i.e., the data source node 302). In the present example, the derived node 306 represents the subset of companies in its parent that are selected by the user (e.g. by a user clicking scatter points in a scatter plot chart based on the scatter plot node 304).

The expand data source node 308 represents a derived data source that expands a one to many data relationship. In the present example, the data source node 308 contains the stock prices for each selected company identified by the filter node 306 as a one-to-many relation.

The reference node 310 represents a derived data source which propagates selection/hover/etc. across the one-to-many relation set forth by the expand node 308. In particular, it results in a new representation of the series data where each point is referenced based on the selection/hover state of its owning company. Alternatively, this propagation can go the other direction—i.e. a company is referenced if any of its series data is selected/hovered over.

The lines visualization node 312 represents a chart that generates one line per group of stock prices. The groups are defined by the expand node 308; where one group is generated per parent company.

Figure 4:
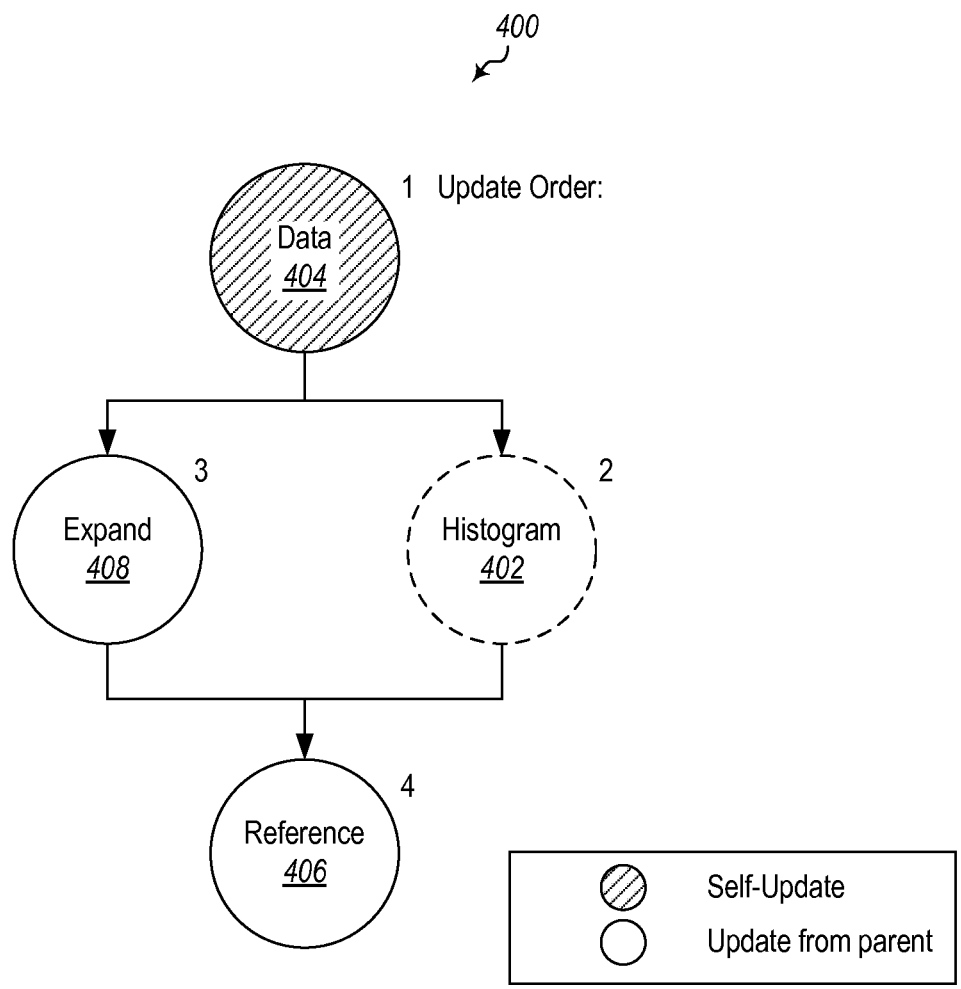
FIG. 4 illustrates still another example of a directed acyclic graph and visualization nodes.

Referring now to FIG. 4, a system for propagating updates is illustrated. FIG. 4 illustrates a data binding graph 400 in which a histogram of metrics (as illustrated by the histogram visualization node 402) from the source data (as illustrated in the data node 404) is used to reference (as illustrated by the reference node 406) an expanded series of data (illustrated by the expand node 408).

Now consider a change to the source data of the data node 404, such as a user selecting an item or binding a replacement dataset. As the data node 404 has changed, it and all of its descendants are marked for update.

Updates of the graph 400 may performed using one or more update locks. In particular, while user interaction is occurring, the graph 400 may be blocked from updating. When the update lock is released, embodiments topologically sort the nodes marked for update. Further embodiments visit each node in the determined topological order (see update order in FIG. 4). Embodiments then perform a parent-update for any node whose parent(s) have already updated. For example, embodiments may calculate new histogram bins. Note that any changes to a node while it is updating can be ignored (i.e. a new propagation is not needed) without violating the topological ordering; this allows derived data sources to function during the update.

Figure 5:
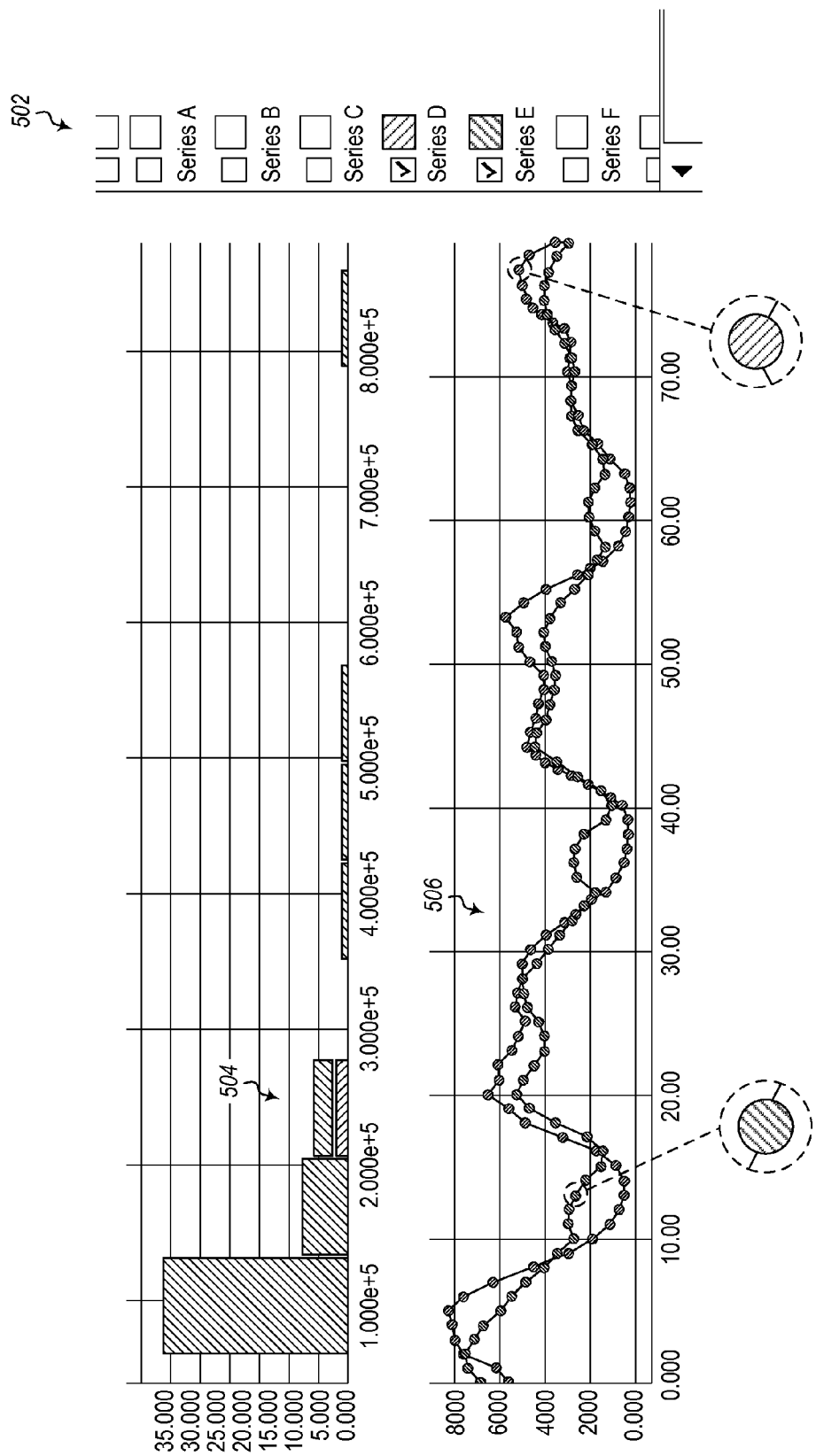
FIG. 5 illustrates examples of linked charts.

Referring now to FIG. 5, a brushing and linking example with an interactive legend 502 is illustrated. The legend 502 and both charts, i.e. the histogram bar chart 504 and the line chart 506, are attached to parts of a data binding graph as described above.

Note the legend 502 selection is consistent with the partial selection of a histogram bar and the display of series data (filter+expand as above). Further, the color, which is consistent between the legend 502 and series lines) is assigned within the graph and flows through it The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
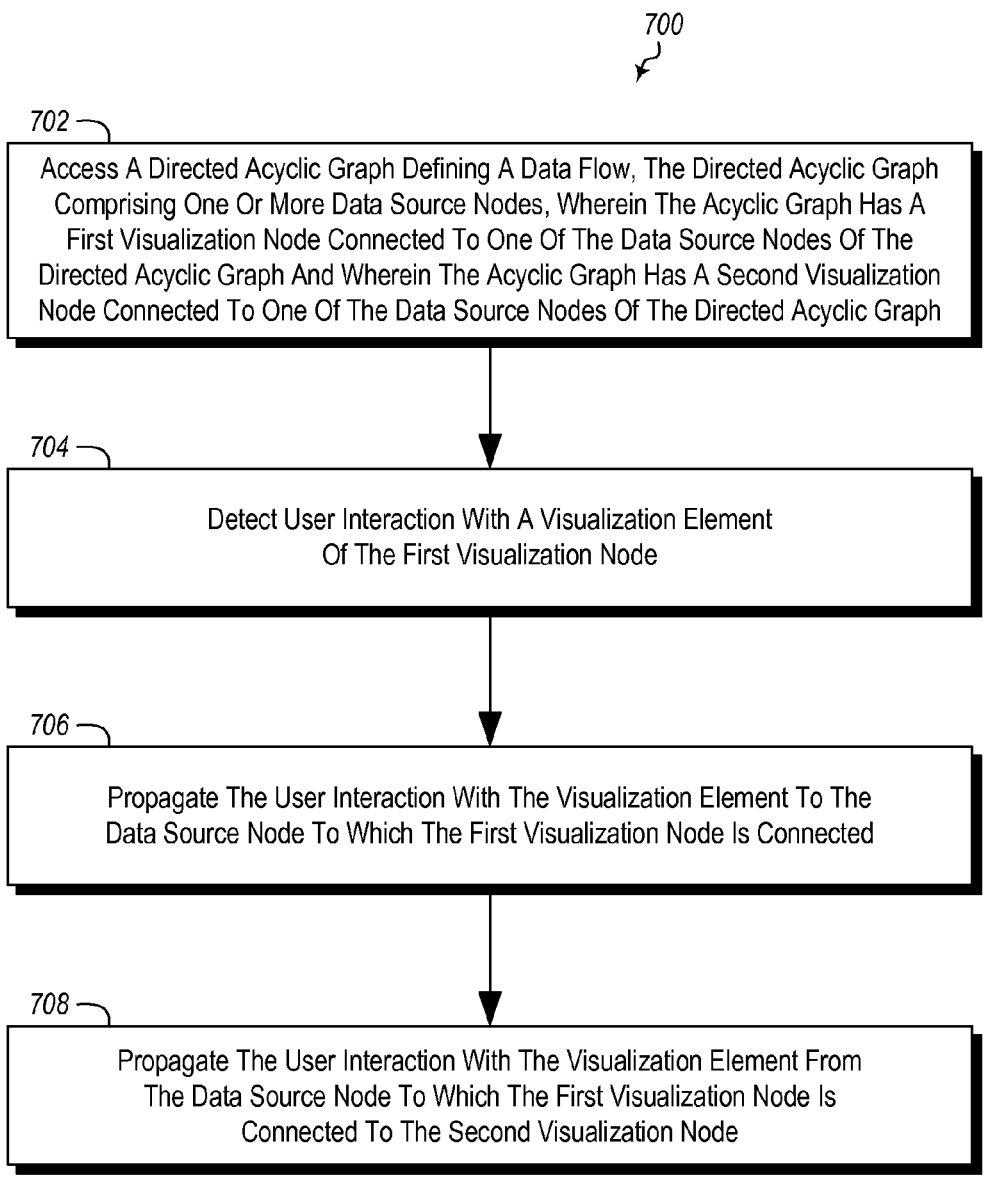
FIG. 7 illustrates a method of implementing multi-view visualizations in a computing environment.

Referring now to FIG. 7, a method 700 is illustrated. The method 700 includes acts for implementing multi-view visualizations in a computing environment. The method 700 includes accessing a directed acyclic graph defining a data flow (act 702). The directed acyclic graph includes one or more data source nodes. The data source nodes include at least one or more data nodes and optionally one or more derived data nodes. The data nodes define data that can flow in the directed acyclic graph. Any derived data nodes define modified data according operations performed on data flowing from a previous node by operation of the directed acyclic graph. The acyclic graph has a first visualization node connected to one of the data source nodes of the directed acyclic graph. The acyclic graph has a second visualization node connected to one of the data source nodes of the directed acyclic graph.

The method 700 includes detecting user interaction with a visualization element of the first visualization node (act 704). Some examples of user interaction may include panning or scrolling, selection of data elements, zooming in or out on data elements, expanding data elements, applying color or highlighting to data elements, etc.

The method of 700 further includes propagating the user interaction with the visualization element to the data source node to which the first visualization node is connected (act 706). For example, as illustrated above in FIG. 1, interaction with the bar chart 110 can be propagated from the visualization node 106 to the data source node 102.

The method 700 further includes propagating the user interaction with the visualization element from the data source node to which the first visualization node is connected to the second visualization node (act 708). For example, in some embodiments, the first and second visualization nodes are connected to the same data source node and as a result, the user interaction with the visualization element is propagated through the same data source node. An example of this is illustrated in FIG. 2. In an alternative embodiment, the first and second visualization nodes are connected to different data source nodes that are coupled through edges in the acyclic directed graph. The user interaction with the visualization element is propagated through operation of the directed acyclic graph such that the user interaction with the visualization flows from the first visualization to the data source node to which the first visualization node is connected, then, by operation of the directed acyclic graph to the data source node to which the second visualization node is connected, and then to the second visualization node. The user interaction results in changes to visualization elements displayed by the second visualization node. An example of this is illustrated by the graph of FIG. 1.

The method 700 may be practiced where one or more of the derived data nodes perform operations on data from a preceding node in the directed acyclic graph. For example, operations may include operations such as filtering data, expanding data, referencing data, linking inheritance (parent child company color inherited to time series points), assignment of color to data points, etc.

Figure 6:
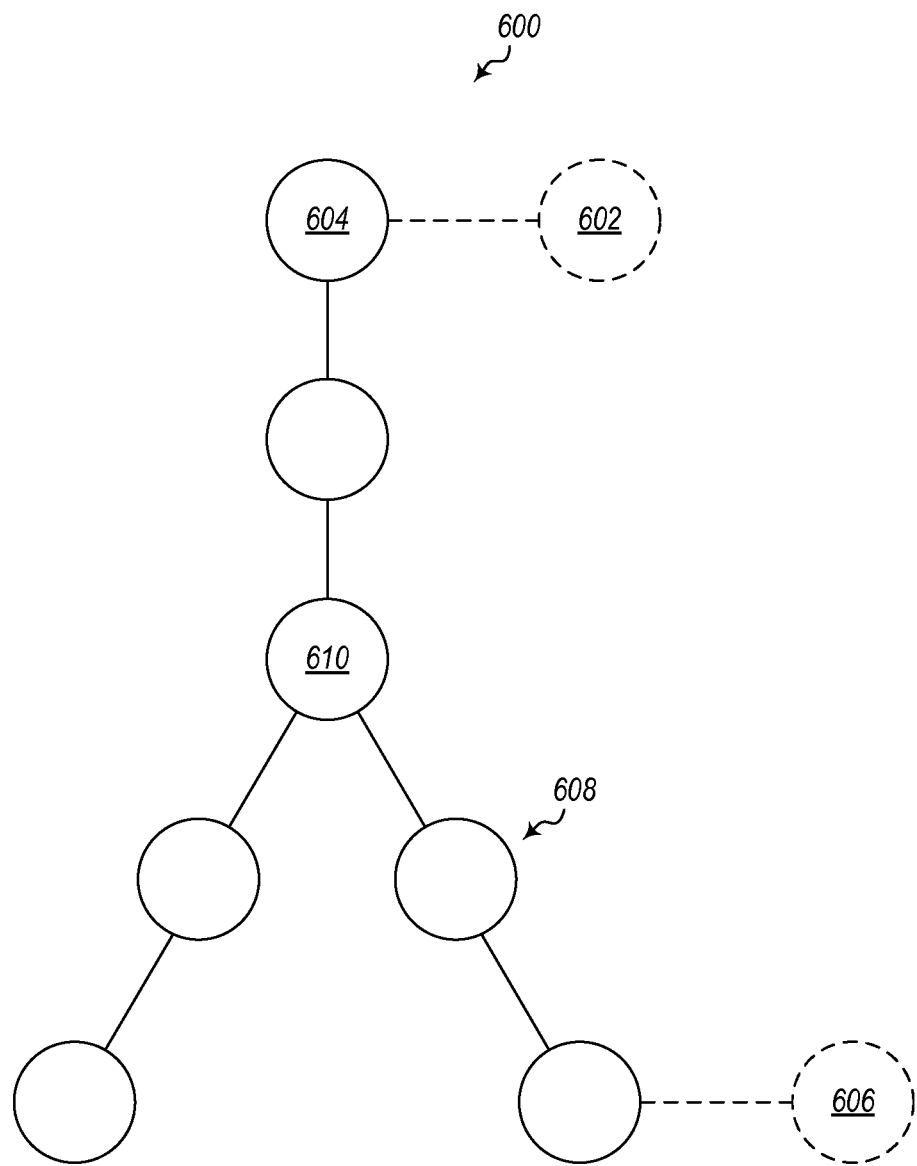
FIG. 6 illustrates another example of a directed acyclic graph and visualization nodes.

The method 700 may be practiced where propagating user interaction comprises propagating only to a dependent sub-graph. For example as illustrated in FIG. 6, a visualization node 602 is coupled to a data source node 604. User interaction with a visualization associated with visualization node 602 is propagated by propagating the interaction to the data source node 604, where it is propagated by operation of the graph 600. However, in the illustrated example, the interaction is only propagated along the dependent sub-graph 608 and not the dependent sub-graph 610. The interaction is then further propagated to the visualization node 606.

The method 700 may further include further receiving user input selecting a data source for a data source node. For example, in some embodiments, a data binding graph, including the attached visualization nodes, may be constructed by a programmer ahead of time. The user may be presented with user interface, such as an interactive dashboard with multiple linked charts. In some such embodiments, the user cannot change the relations between the charts (i.e. the graph), but could choose what dataset is used to populate the graph and charts.

The method 700 may further include: receiving user input to create the directed acyclic graph defining data flow; receiving user input connecting the first visualization nodes to a data source node of the directed acyclic graph defining data flow; and receiving user input connecting the first visualization nodes to a data source node of the directed acyclic graph defining data flow. For example, a data binding graph, including attached visualization nodes, may be authored by a user. The user would first construct the graph by, in a graphical user interface, dragging in data nodes and transform nodes, configuring them, and creating edges. The user would then choose and configure visuals to attach to nodes in the graph.

Figure 8:
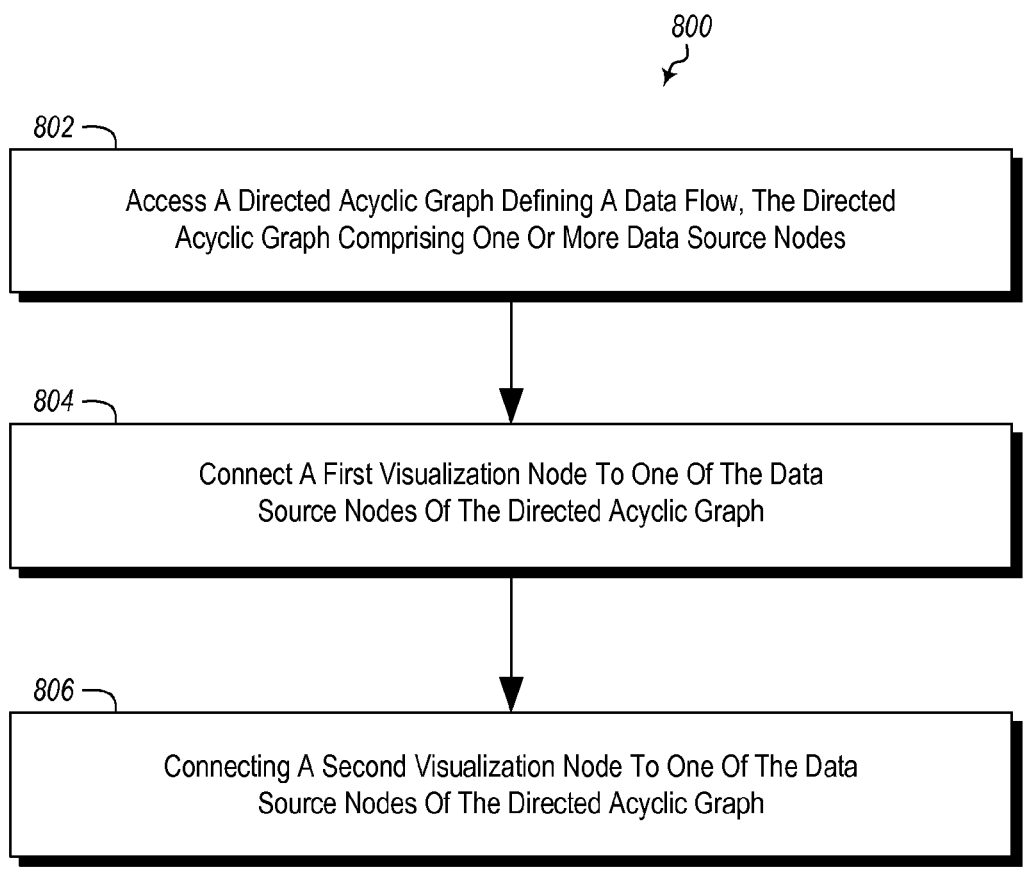
FIG. 8 illustrates another method of implementing multi-view visualizations in a computing environment.

Referring now to FIG. 8, a method 800 is illustrated. The method 800 includes acts for implementing multi-view visualizations in a computing environment. The method 800 includes accessing a directed acyclic graph defining a data flow (act 802). The directed acyclic graph includes one or more data source nodes. The data source nodes include at least one or more data nodes and optionally one or more derived data nodes. The data nodes define data that can flow in the directed acyclic graph. Any derived data nodes define modified data according operations performed on data flowing from a previous node by operation of the directed acyclic graph.

The method 800 further includes connecting a first visualization node to one of the data source nodes of the directed acyclic graph (act 804).

The method 800 further includes connecting a second visualization node to one of the data source nodes of the directed acyclic graph (act 806).

The visualization nodes are connected such that user interaction with a visualization element (e.g. panning, selecting, zooming, coloring, highlighting, etc.,) of the first visualization node; is propagated to the data source node to which the first visualization node is connected and is further propagated therefrom to the second visualization node.

Figure 9:
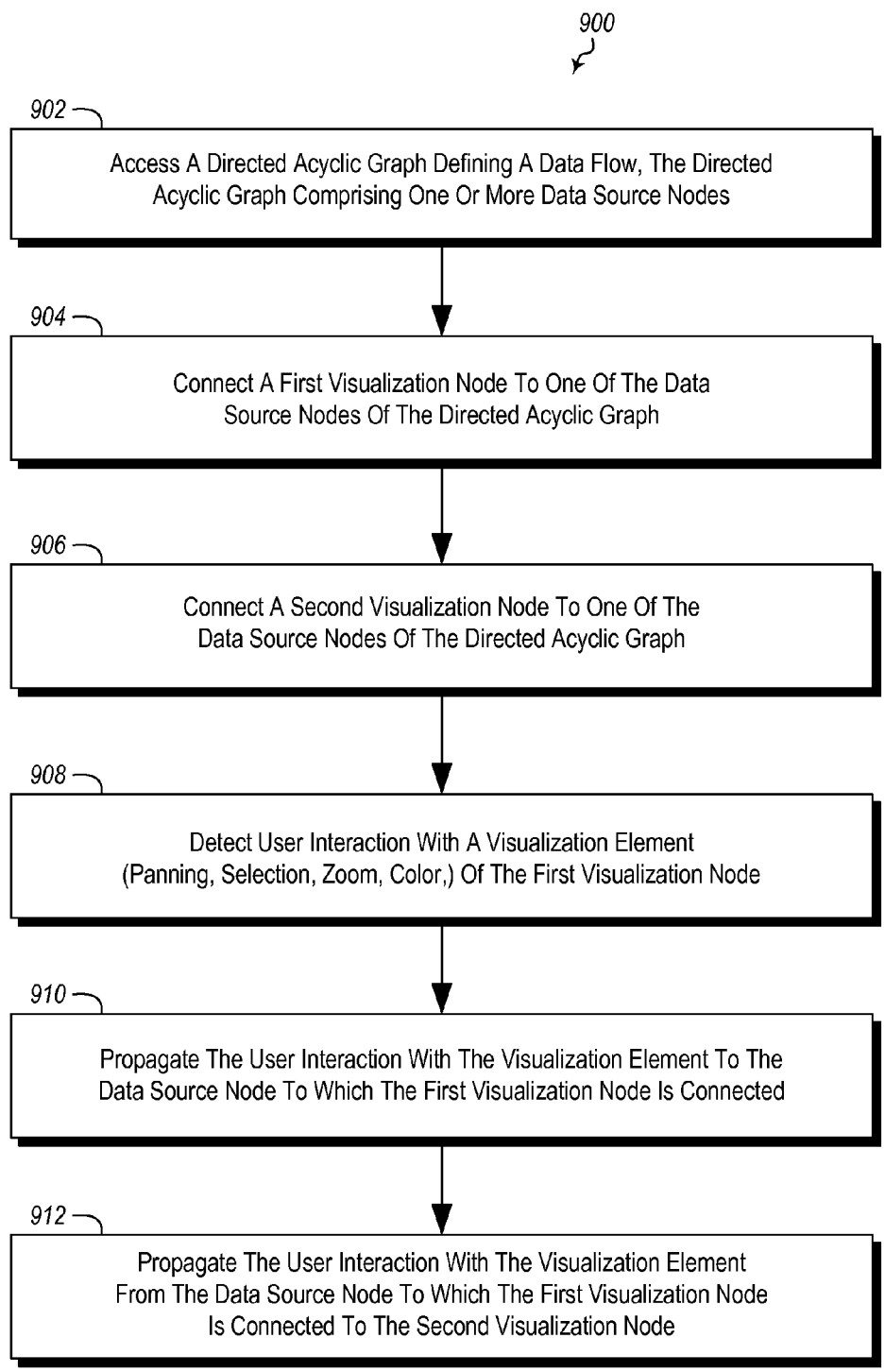
FIG. 9 illustrates another method of implementing multi-view visualizations in a computing environment.

Referring now to FIG. 9, a method 900 of implementing multi-view visualizations in a computing environment is illustrated. The method 900 includes accessing a directed acyclic graph defining a data flow (902). The directed acyclic graph includes one or more data source nodes, the data source nodes include at least one or more data nodes and optionally one or more derived data nodes. The data nodes define data that can flow in the directed acyclic graph. Any derived data nodes define modified data according operations performed on data flowing from a previous node by operation of the directed acyclic graph.

The method 900 further includes connecting a first visualization node to one of the data source nodes of the directed acyclic graph (act 904). For example, a visualization node 106 is connected to a node 102.

The method 900 further includes connecting a second visualization node to one of the data source nodes of the directed acyclic graph (act 906). For example, a visualization node 108 is connected to a node 104.

The method 900 further includes detecting user interaction with a visualization element of the first visualization node (act 908). For example, such interaction may include panning or scrolling, selection of data elements, zooming in or out on data elements, expanding data elements, applying color or highlighting to data elements, etc.

The method 900 further includes propagating the user interaction with the visualization element to the data source node to which the first visualization node is connected (act 910). For example, as illustrated in FIG. 1, user interaction with the chart 110 is propagated through the visualization node 106 to the node 102.

The method 900 further includes propagating the user interaction with the visualization element from the data source node to which the first visualization node is connected to the second visualization node (act 912). For example, as illustrated in FIG. 1, by operation of the graph 100, the visualization is propagated to the visualization node 108.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, implemented at a computer system that includes one or more processors, for implementing multi-view visualizations in a computing environment, the method comprising:
   accessing, by the one or more processors, a directed acyclic graph defining a data flow, the directed acyclic graph comprising:
      a data source node that defines source data that flows downstream from the data source node in the directed acyclic graph;
      a first derived data node positioned downstream from the data source node in the directed acyclic graph, the first derived data node defining a first data modification operation to be performed on any data flowing from the data source node to the first derived data node by operation of the directed acyclic graph; and
      a second derived data node positioned downstream from the first derived data node in the directed acyclic graph, the second derived data node defining a second data modification operation to be performed on any data flowing from the first derived data node to the second derived data node by operation of the directed acyclic graph;
   connecting, by the one or more processors, a first visualization to the data source node, the first visualization being configured to visualize the source data as received from the connected data source node;
   connecting, by the one or more processors, a second visualization to the first derived data node or to the second derived data node, the second visualization being configured to visualize any data as received from the connected derived data node;
   detecting, by the one or more processors, user interaction with the first visualization;
   propagating, by the one or more processors, the user interaction with the first visualization to the data source node and from the data source node through one or both of the first derived data node and the second derived data node to the second visualization, including:
      when the second visualization is connected to the first derived data node, causing the second visualization to display the source data in accordance with the user interaction with the first visualization and in accordance with the first data modification operation; and
      when the second visualization is connected to the second derived data node, causing the second visualization to display the source data in accordance with the user interaction with the first visualization and in accordance with both the first data modification operation and the second data modification operation.

2. The method of claim 1, wherein propagating the user interaction comprises propagating a selection of one or more data elements in the first visualization to a selection of one or more corresponding data elements in the second visualization.

3. The method of claim 1, wherein propagating the user interaction comprises propagating expansion of data elements from the first visualization to the second visualization.

4. The method of claim 1, wherein propagating the user interaction comprises propagating an assignment of color to data elements from the first visualization to the second visualization.

5. The method of claim 1, wherein propagating the user interaction comprises propagating the user interaction through only to a dependent sub-graph of the source data node in the directed acyclic graph, while refraining from propagating the user interaction to one or more other sub-graphs of the directed acyclic graph.

6. The method of claim 1, comprising receiving user input selecting a data source for the data source node.

7. The method of claim 1, further comprising:
   receiving user input to create the directed acyclic graph;
   receiving user input for connecting a first visualization node to the data source node, the first visualization node being configured to produce the first visualization; and
   receiving user input for connecting a second visualization node to the first derived data node or to the second derived data node, the second visualization node being configured to produce the second visualization.

8. The method of claim 1, wherein the at least one data modification is selected from the group comprising a color assignment, an expansion of one-to-many relationships in the source data, filtering, grouping, and reduction including many-to-one calculations.

9. A system for implementing multi-view visualizations in a computing environment, the system comprising
   one or more processors; and
   one or more computer readable media comprising computer executable instructions that when executed by at least one of the one or more processors configure at least one of the one or more processors to perform at least the following:
      access a directed acyclic graph defining a data flow, the directed acyclic graph comprising:
         a data source node that defines source data that flows downstream from the data source node in the directed acyclic graph;
         a first derived data node positioned downstream from the data source node in the directed acyclic graph, the first derived data node defining a first data modification operation to be performed on any data flowing from the data source node to the first derived data node by operation of the directed acyclic graph; and
         a second derived data node positioned downstream from the first derived data node in the directed acyclic graph, the second derived data node defining a second data modification operation to be performed on any data flowing from the first derived data node to the second derived data node by operation of the directed acyclic graph;
      connect a first visualization to the data source node, the first visualization being configured to visualize the source data as received from the connected data source node; and
      connect a second visualization to the first derived data node or to the second derived data node, the second visualization being configured to visualize any data as received from the connected derived data node,
      wherein first visualization and second visualization are connected by the directed acyclic graph, such that user interaction with the first visualization is propagated to the data source node and from the data source node through one or both of the first derived data node and the second derived data node to the second visualization, including:
>when the second visualization is connected to the first derived data node, the second visualization displays the source data in accordance with the user interaction with the first visualization and in accordance with the first data modification operation; and
>when the second visualization is connected to the second derived data node, the second visualization displays the source data in accordance with the user interaction with the first visualization and in accordance with both the first data modification operation and the second data modification operation.

10. The system of claim 9, wherein the user interaction is propagated by propagating a selection of one or more data elements in the first visualization to a selection of one or more corresponding data elements in the second visualization.

11. The system of claim 9, wherein the user interaction is propagated by propagating expansion of data elements from the first visualization to the second visualization.

12. The system of claim 9, wherein the user interaction is propagated by propagating an assignment of color to data elements from the first visualization to the second visualization.

13. The system of claim 9, wherein propagating the user interaction comprises propagating the user interaction through only to a dependent sub-graph of the source data node in the directed acyclic graph, while refraining from propagating the user interaction to one or more other sub-graphs of the directed acyclic graph.

14. The system of claim 9, wherein the at least one data modification is selected from the group comprising a color assignment, an expansion of one-to-many relationships in the source data, filtering, grouping, and reduction including many-to-one calculations.

15. A computer program product for implementing multi-view visualizations in a computing environment, the computer program product comprising one or more hardware storage devices having stored thereon computer executable instructions that when executed by one or more processors configure the one or more processors to perform at least the following:
>access a directed acyclic graph defining a data flow, the directed acyclic graph comprising:
>>a data source node that defines source data that flows downstream from the data source node in the directed acyclic graph;
>>a first derived data node positioned downstream from the data source node in the directed acyclic graph, the first derived data node defining a first data modification operation to be performed on any data flowing from the data source node to the first derived data node by operation of the directed acyclic graph; and
>>a second derived data node positioned downstream from the first derived data node in the directed acyclic graph, the second derived data node defining a second data modification operation to be performed on any data flowing from the first derived data node to the second derived data node by operation of the directed acyclic graph;
>connect a first visualization to the data source node, the first visualization being configured to visualize the source data as received from the connected data source node;
>connect a second visualization to the first derived data node or to the second derived data node, the second visualization being configured to visualize any data as received from the connected derived data node;
>detect user interaction with the first visualization;
>propagate the user interaction with the first visualization to the data source node and from the data source node to the second visualization, including:
>>when the second visualization is connected to the first derived data node, causing the second visualization to the source data in accordance with the user interaction with the first visualization and in accordance with the first data modification operation; and
>>when the second visualization is connected to the second derived data node, causing the second visualization to display the source data in accordance with the user interaction with the first visualization and in accordance with both the first data modification operation and the second data modification operation.

16. The computer program product of claim 15, wherein propagating the user interaction comprises propagating a selection of one or more data elements in the first visualization to a selection of one or more corresponding data elements in the second visualization.

17. The computer program product of claim 15, wherein propagating the user interaction comprises propagating an expansion of data elements from the first visualization to the second visualization.

18. The computer program product of claim 15, wherein propagating the user interaction comprises propagating an assignment of color to data elements from the first visualization to the second visualization.

19. The computer program product of claim 15, wherein propagating the user interaction comprises propagating the user interaction through only to a dependent sub-graph of the source data node in the directed acyclic graph, while refraining from propagating the user interaction to one or more other sub-graphs of the directed acyclic graph.

20. The computer program product of claim 15, wherein the at least one data modification is selected from the group comprising a color assignment, an expansion of one-to-many relationships in the source data, filtering, grouping, and reduction including many-to-one calculations.

* * * * *